United States Patent Office 3,388,269
Patented June 11, 1968

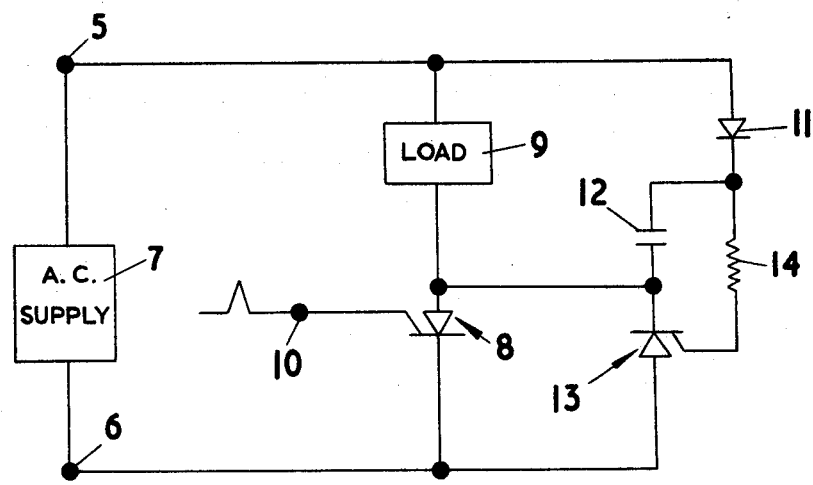

3,388,269
A.C. CONTROL CIRCUIT
Michael Murray Bertioli, Lichfield, England, assignor to Joseph Lucas (Industries) Limited, Birmingham, England
Filed Mar. 2, 1965, Ser. No. 436,623
Claims priority, application Great Britain, Mar. 3, 1964, 8,876/64
2 Claims. (Cl. 307—252)

The object of this invention is to provide an A.C. control circuit in a convenient form whereby when a semiconductor switch is switched on during a half-cycle of an A.C. supply, current will flow through a load during the remainder of that half-cycle and the next half-cycle.

A control circuit according to the invention comprises a first controlled rectifier connected in series with a load between terminals which in use are connected to the A.C. source, a second controlled rectifier having its cathode and anode connected respectively to the anode and cathode of the first controlled rectifier, and a capacitor arranged to be charged when the first controlled rectifier conducts, and to discharge through the gate and cathode of the second controlled rectifier when the first controlled rectifier ceases to conduct at the end of a half cycle, so that the second controlled rectifier is rendered conductive and conducts for the next half cycle.

The accompanying drawing is a circuit diagram illustrating one example of the invention.

Referring to the drawing, there are provided first and second terminals 5, 6 which in use are connected to an A.C. supply 7. Connected to the terminal 6 is the cathode of a controlled rectifier 8, the anode of which is connected to the terminal 5 through a load 9, and the gate of which is connected to a terminal 10 to which in use control pulses are supplied. The terminals 5, 6 are further interconnected through a series circuit including the anode and cathode of a second diode 11, a capacitor 12, and the cathode and anode of a second controlled rectifier 13. A point intermediate the capacitor 12 and the cathode of the controlled rectifier 13 is connected to the anode of the controlled rectifier 8, and a point intermediate the diode 11 and capacitor 12 is connected through a resistor 14 to the gate of the controlled rectifier 13.

In use, assuming that a positive control pulse is applied to the terminal 10 at the commencement of a positive half cycle of the A.C. supply, the controlled rectifier 8 will be rendered conductive and current will flow in the load 9. At the same time, the capacitor 12 will be charged through the diode 11 and the controlled rectifier 8. After the first half of the positive half-cycle, the capacitor 12 starts to discharge, and at the end of the positive half cycle, the reverse bias applied across the controlled rectifier 8 by the supply 7 will switch it off, the capacitor 12 simultaneously continuing to discharge through the resistor 14 and the gate and cathode of the controlled rectifier 13. This discharge current will switch on the controlled rectifier 13, and so current will continue to flow through the load 9. At the end of the negative half cycle, the reverse voltage applied across the controlled rectifier 13 by the supply will switch it off. Moreover, the arrangement is such that by this time the capacitor has substantially discharged, so that no significant signal appears at the gate of the controlled rectifier 13 during the next negative half cycle if the rectifier 8 is not fired again.

At the end of the negative half cycle, no further current will flow through the load until the controlled rectifier 8 receives a further pulse. It will be understood that the pulse applied to the controlled rectifier 8 must be applied at such a time during the positive half cycle that the capacitor 12 can charge to a value sufficient to switch on the controlled rectifier 13 when the first controlled rectifier 8 is switched off.

The circuit is particularly intended for use in our pending application No. 436,624, filed Mar. 2, 1965, now U.S. Patent No. 3,356,784, in which any pulses applied to the controlled rectifier 8 are applied at the commencement of the positive half cycle.

Having thus described my invention what I claim as new and desire to secure by Letters Patent is:

1. An A.C. control circuit comprising a first controlled rectifier connected in series with a load between terminals which in use are connected to the A.C. source, a second controlled rectifier having its cathode and anode connected respectively to the anode and cathode of the first controlled rectifier, and a capacitor arranged to be charged when the first controlled rectifier conducts, and to discharge through the gate and cathode of the second controlled rectifier when the first controlled rectifier ceases to conduct at the end of a half cycle, so that the second controlled rectifier is rendered conductive and conducts for the next half cycle.

2. A circuit as claimed in claim 1 including a diode connected in series with the capacitor and the anode and cathode of the first controlled rectifier to provide a charging path for the capacitor, and a resistor connected in series with the gate and cathode of the second controlled rectifier across the capacitor to provide a discharge path for the capacitor.

References Cited
UNITED STATES PATENTS
3,238,390   3/1966   Pinckaers _____ 307—88.5

ARTHUR GAUSS, Primary Examiner.
D. D. FORRER, Assistant Examiner.